United States Patent Office 2,894,044
Patented July 7, 1959

2,894,044

PREPARATION OF 1,1-DICHLORO-1-FLUOROETHANE

Erhard J. Prill, Dayton, Ohio, assignor to Monsanto Chemical Company, St. Louis, Mo., a corporation of Delaware No Drawing. Application February 16, 1956
Serial No. 565,777

8 Claims. (Cl. 260—653.7)

An object of this invention is to provide a commercially feasible process for the production of 1,1-dichloro-1-fluoroethane, particularly a process which is adaptable to forming a continuous process for preparing vinylidene chlorofluoride by preparing 1,1-dichloro-1-fluoroethane and immediately pyrolyzing the said dichlorofluoroethane to vinylidene chlorofluoride.

The process of pyrolyzing 1,1-dichloro-1-fluoroethane to vinylidene chlorofluoride and the combination of this process with the fluorination of methyl chloroform to 1,1-dichloro-1-fluoroethane are disclosed and claimed in my copending application, Serial No. 565,776, filed of even date herewith.

The present invention is directed to the vapor phase fluorination of methyl chloroform to 1,1-dichloro-1-fluoroethane by use of hydrogen fluoride over a catalyst selected from the group consisting of stannic fluoride on activated carbon and aluminum fluoride, particularly at low temperatures in the range of 60 to 150° C. Of the above catalysts, aluminum fluoride is preferred because, with this catalyst it is possible to obtain high yield and purity of product with fairly good conversion.

The fluorination of methyl chloroform, i.e., 1,1,1-trichloroethane, in the liquid phase in the absence of catalysts, e.g., in a bomb under pressure, is a known method of producing 1,1-dichloro-1-fluoroethane but the process apparently involves some dehydrohalogenation and gives an impure product. Moreover, a vapor phase fluorination has certain advantages over such liquid phase reactions from the standpoint of economics, and because a vapor phase reaction is more readily adapted to continuous flow processes.

It has not been found possible, however, to simply fluorinate methyl chloroform with hydrogen fluoride in the vapor phase in the absence of catalysts, and obtain a good yield of dichlorofluoroethane. Apparently the halogen compounds involved in this reaction are much more subject to dehydrohalogenation in vapor phase reactions than they are in liquid phase reactions under pressure. All of my attempts to fluorinate methyl chloroform in the vapor phase in the absence of catalysts have been unsuccessful.

The vapor phase fluorination of halogen compounds by use of hydrogen fluoride at high temperatures, e.g., 400–700° C., is a known procedure. However, these high temperatures cannot be used in fluorinating methyl chloroform. The fluorination of methyl chloroform in the vapor phase presents a special problem, as methyl chloroform is particularly susceptible to dehydrohalogenation. It is necessary to use a catalyst which catalyzes fluorination, but not dehydrohalogenation. It is surprising that aluminum fluoride can be used for this purpose, as aluminum fluoride is a well known catalyst for dehydrohalogenation and disproportionation reactions of halogen compounds. However, I have found that in the fluorination of methyl chloroform under certain conditions aluminum fluoride causes fluorination without any appreciable dehydrohalogenation.

One of the particular advantages of my aluminum fluoride catalyst is that its use permits the preparation of a dichlorofluoroethane of high purity. The vinylidene chloride which usually accompanies the dichlorofluoroethane when other catalysts are used has the same boiling point as dichlorofluoroethane, 31.7° C. A higher boiling point for vinylidene chloride is reported in some of the older literature, but the more recently reported value of 31.7° C. appears to be the correct one. Moreover, in my attempts to use reported physical constants of dichlorofluoroethane as standards for the evaluation of the purity of my products, I have discovered that the dichlorofluoroethanes upon which the physical values were reported must have contained substantial amounts of vinylidene chloride as an impurity. In this connection, it is of interest that in a liquid phase fluorination of methyl chloroform with hydrogen fluoride at 140° C. for 1 hour under pressure in an iron vessel and in the absence of a catalyst, a product boiling at 30–32° C. was obtained which had a refractive index of $n_D^{26}$ 1.3773, indicating it contained about 20% vinylidene chloride.

While stannic fluoride on active carbon is less satisfactory as a catalyst than aluminum fluoride, its use does permit vapor phase fluorination of methyl chloroform at low temperatures to give appreciable yields of 1,1-dichloro-1-fluoroethane.

In the fluorination of methyl chloroform with the catalysts of my invention, it is preferred to use reaction temperatures of 60 to 125° C. With my preferred aluminum fluoride catalyst, I especially prefer temperatures of 90 to 125° C.

The reaction time should be sufficient to fluorinate a substantial quantity of methyl chloroform to dichlorofluoroethane and can vary, for example, from about 5 to 60 seconds or the like. At my preferred reaction temperatures, reaction times of 5 to 20 seconds are ordinarily preferred, and the most effective reaction time was usually 10 to 15 seconds. Of course, the preferred reaction times can vary to some extent with the ratio of hydrogen fluoride to methyl chloroform. The reaction time is the time that a unit volume of the reactants remains in the reactor tube. This contact time may be calculated by dividing the volume of the reactor by the volume of the reactants charged (at reaction temperature) per sceond.

The molar ratio of hydrogen fluoride to methyl chloroform can vary over a considerable range, e.g., from 1:1 to 4:1. However, in order to avoid the use of an unnecessary excess of hydrogen fluoride and the resulting necessity of recovering a large excess of hydrogen fluoride, it will usually be preferable to use ratios of 1 (or slightly over 1):1 to 2:1. The actual excess used will be governed to some extent by the contact time, and by the economic desirability of high conversion compared with the economic advantage or disadvantage of the production of higher fluorinated compounds. In some special applications, it may be desirable to use less than a molar ratio of hydrogen fluoride, e.g., 0.5:1, as when it is desired to avoid production of any highly fluorinated compounds.

In order to have a pure sample of dichlorofluoroethane for refractive index evaluation of the product of the fluorination reactions, an impure sample of dichlorofluoroethane was brominated with excess bromine, and, after washing and drying, the product was fractionated, a dichlorofluoroethane cut being made at 30.3 to 30.8° C. This fraction had a refractive index $n_D^{25}$ 1.3660. After considerable material distilled at 30.8 to 31.2° C., a large residue of 1,2-dibromo-1,1-dichloroethane remained. From the refractive indices of several known mixtures of pure dichlorofluoroethane and pure vinylidene chloride, a graph was constructed for use in determining the composition of vinylidene chloride-dichlorofluoroethane mixtures. The accuracy of this method of analysis of such mixtures was substantiated by infrared analysis of several mixtures.

The general procedure used in the following examples of the present invention was to preheat the hydrogen fluoride and methyl chloroform and pass the heated gases through a hot catalyst-packed reactor tube, along with a slight stream of nitrogen, and to pass the reactor off gases through a water quencher cooled by ice water, a water scrubber and a drying train, and then through a receiver flask cooled by Dry Ice. The bulk of the product was usually present as an oily layer in the water quencher, although some low boiling product was often condensed in the receiver flask. The nitrogen stream was used to insure against water in the water quencher backing into the reactor tube.

The apparatus utilized in the process of the invention was a 1 inch O.D. nickel tube 42 inches long and having a volume of approximately 375 ml., with a side tube at one end which could be heated as a preheater section; a connecting tube leading from the discharge end of the reactor into water in a quencher; washing and drying trains, and a receiver flask. Several types of hydrogen fluoride and methyl chloroform metering devices were used. For the hydrogen fluoride, a critical orifice, a rotameter, or a venturi-flow meter was used, the latter being preferred. The methyl chloroform was vaporized into a regulated stream of gas, e.g., nitrogen, at a particular temperature so as to saturate the gas stream, or the liquid was allowed to flow through a rotameter, the latter method being most convenient. Of course, these metering devices were for control only, the reported amount of hydrogen fluoride being determined by titration, and the amount of methyl chloroform by weight.

EXAMPLE 1

The vaporizer-preheater was heated to 115° C. and the reactor containing aluminum fluoride catalyst was heated to 100° C. During a four-hour period, 514 grams (3.85 moles) $CH_3CCl_3$ were charged at a constant rotameter reading along with a stream of hydrogen fluoride at a constant flow meter reading. The preheated temperature varied from 110° to 115° during the run, and the reactor temperatures varied from 97° to 110° C. At the completion of the run, the reactor was flushed with nitrogen. Titration of the aqueous phase of the water trap liquid showed 8.75 gram-equivalents acid, and 1.56 gram-equivalents of chloride ion was present. From the titration of the acid, after allowing for the hydrochloric acid formed during $CH_2=CCl_2$ formation, the HF flow rate was calculated as 2.18 gram-equivalents per hour. The 459 grams of oily product was fractionated to give:

I. —7 to 4° C., 2.0 grams
II. 4–28° C., 4.0 gram
III. 28–31.5° C., 128.0 grams, $n_D^{25}$ 1.3682
IV. 31.5–65° C., 6.5 grams, $n_D^{25}$ 1.3780
V. 317 grams of methyl chloroform recovered as residue.

The above temperature values are uncorrected.

From the refractive index of fraction III, it was calculated that this 1,1-dichloro-1-fluoroethane fraction contained about 3.5% 1,1-dichloroethylene as an impurity. The total amounts of the various products in the fraction were determined, and, of the starting 3.5 moles of methyl chloroform, 29.9% was converted to the desired dichlorofluoroethane product, 1.6% to 1,1-dichloroethane, 0.8% to 1-chloro-1,1-difluoroethane, and 62.8% of the methyl chloroform was recovered. The 96.5% purity of the main fraction of dichlorofluoroethane makes this procedure especially attractive. The percentage of the theoretical yield, based on unrecovered methyl chloroform, was 80.4%.

It will be noted that in the fluorination reaction of this invention the gram-equivalent weight equals the gram molecular weight, so gram-equivalents equal moles.

EXAMPLE 2

The general procedure of Example 1 was used with the same reactor packed with aluminum fluoride, but the reactor temperature was higher, varying from 145 to 160° C., being about 150° on the average, and the preheater was at 165 to 170° C. During the four-hour run, the methyl chloroform feed rate averaged 0.95 equivalent per hour, and the HF feed rate was 1.03 equivalents per hour. While 32.1% of the methyl chloroform was converted to the desired dichlorofluoroethane, the higher temperature caused considerable dehydrohalogenation as shown by the 23.4% conversion to 1,1-dichloroethylene, i.e., vinylidene chloride, and the fact that the purity of the dichlorofluoroethane fraction was only 62%. There was also 5.5% fluorination to chlorodifluoroethane. The contact time in this example was 19.3 seconds.

EXAMPLE 3

The general procedure of Example 1 was followed, but the reactor tube was packed with stannic fluoride on activated carbon as the catalyst. The reactor temperature was 100° C. and the feed rates of methyl chloroform and hydrogen fluoride during the four-hour run were respectively 0.58 and 2.14 equivalents per hour. The conversion to dichlorofluoroethane was 55% and the dichlorofluoroethane fraction had a purity of 89%.

EXAMPLE 4

In another run with stannic fluoride on activated carbon as the catalyst, the reactor temperature was 120 to 125° C. and the contact time was 12.9 seconds, and the procedure resulted in a 45% conversion to dichlorofluoroethane; the dichlorofluoroethane fraction had a purity of 88%. The yield was 68.2% of theory.

EXAMPLE 5

In another run with stannic fluoride on activated carbon as catalyst, the reaction was run at a temperature of about 60 to 70° C., and the contact time was 12.7 seconds. The procedure resulted in 13.2% conversion to dichlorofluoroethane, and the purity of the dichlorofluoroethane fraction was 95.5%. Of the starting methyl chloroform, 79.3% was recovered.

EXAMPLE 6

A run was made to determine whether activated carbon alone would act as a fluorination catalyst. Methyl chloroform at a rate of 0.79 gram-equivalent/hour and hydrogen fluoride at a rate of 3.70 gram-equivalents/ hour were passed through the reactor packed with activated carbon at a temperature of 100° C. for 4 hours. The conversion to dichlorofluoroethane was only 0.3%, and the conversion to 1,1-dichloroethylene was only 1%, and 81.2% of the methyl chloroform was recovered. The results indicate that activated carbon in itself does not act as a fluorination catalyst at the above temperature in these reactions, although it may aid in retarding dehydrohalogenation. When accompanied by stannic fluoride, however, the activated carbon will aid the fluorination at the above temperature.

EXAMPLE 7

A run was made with antimony pentafluoride on activated carbon as catalyst with a reactor temperature of 95 to 103° C. The methyl chloroform feed rate was 0.96 gram-equivalent weights per hour, and the hydrogen fluoride rate was 2.39 gram-equivalent weights per hour. Much low boiling material formed in the reaction, so about half the product was in the Dry Ice trap. The organic layer in the water trap was separated and combined with the liquid from the Dry Ice trap. The lower boiling portion of the product was distilled through a water scrubber and a calcium chloride train, and condensed in a receiver. The remaining higher boiling fraction was washed and then dried over magnesium sulfate and added to the distilled portion of the product. Fractionation of the product showed that the conversion to dichlorofluoroethane was 31.4%, and the purity was 87.5%, but a large part of the methyl chloroform was converted to higher fluorinated products, and vinylidene chloride, only 12% of the methyl chloroform being recovered. The yield was only 35.7%.

EXAMPLE 8

In a fluorination run conducted at 250° C. over aluminum fluoride, there was about 90% conversion to a product containing 19% dichlorofluoroethane and 81% vinylidene chloride.

EXAMPLE 9

A vapor phase fluorination of methyl chloroform by use of hydrogen fluoride in the absence of catalyst was attempted. During a 2.5 hour run, 2.3 moles of methyl chloroform and 1.9 gram-equivalents of hydrogen fluoride were charged to the reactor heated at 250° C. The reactor was packed with nickel helices to aid heat transfer, and a 12 liter/hour nitrogen stream was used to carry the vaporized methyl chloroform into the reactor. The procedure caused excessive dehydrohalogenation, as the dichlorofluoroethane fraction of the product contained only 13% dichlorofluoroethane, the ermainder being vinylidene chloride.

The stannic fluoride on activated carbon catalyst used in the present invention was prepared as follows: Stannic chloride, 125 grams, was added in small portions to 134 grams activated carbon (Pittsburgh Coke and Chemical, BP 6 x 8) in a 500 ml. Erlenmeyer flask with shaking during the exothermic reaction. Hydrogen fluoride gas was passed over the stannic chloride on activated carbon catalyst in the nickel reactor at a rate of 1 gram-equivalent weight per hour for 5 hours. During the reaction the temperature rose to 60° C., and fell slowly after 4 hours. The catalyst can also be prepared by other methods, such as by adding stannic fluoride to activated carbon, e.g., by vaporizing the stannic fluoride and absorbing it on the carbon. The methods of preparing activated carbons are well known, and any activated carbon can be used.

The aluminum fluoride catalyst was prepared by treating anhydrous aluminum chloride with anhydrous hydrogen fluoride. For example, the nickel reactor was charged with 422 grams (3.16 moles) of granular anhydrous aluminum chloride. Hydrogen fluoride was passed in slowly for about 20 hours. Any type of aluminum fluoride can be used as catalyst, prepared in situ or otherwise, although it must be anhydrous to be very active. If the aluminum fluoride catalyst is prepared from commercial granular anhydrous aluminum chloride, the aluminum fluoride will have substantially the same mesh size as the aluminum chloride, i.e., 6 to 20 mesh; of course, larger or smaller mesh catalysts can be used. The crystal size of the catalyst can vary widely, e.g., from below 200 Angstrom units radius to above 1000 Angstrom units radius.

The fluorination reaction of the present invention is most conveniently and economically conducted at atmospheric pressure, as this avoids the use of high pressure equipment. However, the reaction can be conducted at higher or lower pressures. The required reaction time will ordinarily vary inversely with the temperature. Moreover, the operating ranges of temperatures, reaction times, etc., described herein will vary somewhat according to the heat transfer properties of the reactor, the pressure, the activity of a particular catalyst batch, etc. as will be recognized by those skilled in the art, and all such normal variations are within the scope of the present invention.

While the aluminum fluoride is ordinarily used as a catalytic reactor packing without any supporting material, it can be used with the catalyst support materials known to the art; e.g., the aluminum fluoride can be supported by charcoal granules.

It will be recognized, of course, that the use of the particular apparatus described herein is not essential to the practice of the invention. Reactors of other sizes and shapes, and made of other materials can be used. In order to have materials resistant to hydrogen fluoride and high temperature, the tube can be lined with a noble metal, e.g., platinum, palladium, silver, etc. Of course, aluminum can be used for the reactor tube, as aluminum fluoride catalyzes the fluorination.

While it is convenient as a laboratory procedure to use a water quencher to remove product and acids from the reactor off-gases, it will be preferred in plant operations to separate all products by distillation in order that the hydrogen fluoride, methyl chloroform, etc., can be recycled to the reactor.

For purposes of comparison, a number of fluorination runs, in which various catalysts and reaction conditions are used, are summarized in the table below. Some of the examples above are included in the table.

*Table*

| Run | Catalyst | CH₃CCl₃, moles/hr. | HF, moles/hr. | Average Reactor Temp., °C. | Contact Time, seconds | CH₃CCl₃ Recovered, Percent | (a) Products Recovered, Percent Conversion | | | | (b) Purity CH₃CFCl₂ Fraction, Percent | Yield CH₃CFCl₂, Percent |
|---|---|---|---|---|---|---|---|---|---|---|---|---|
| | | | | | | | CH₃CFCl₂ | CH₃CF₂Cl | CH₃CF₃ | CH₂=CCl₂ | | |
| 1 | AlF₃ | 0.96 | 2.18 | 100 | 13.8 | 62.8 | 29.9 | 0.8 | | 1.6 | 96.5 | 80.4 |
| 2 | AlF₃ | 0.95 | 1.03 | 150 | 19.3 | 30.5 | 32.1 | 5.5 | 2.5 | 23.4 | 62.0 | 46.2 |
| 3 | SnF₄/C* | 0.58 | 2.14 | 100 | 12.7 | 10.3 | 55.0 | 11.8 | | 17.3 | 89.0 | 61.3 |
| 4 | SnF₄/C* | 0.54 | 2.05 | 120–125 | 12.9 | 34.0 | 45.0 | 13.0 | | 6.5 | 88.0 | 68.2 |
| 5 | SnF₄/C* | 0.99 | 1.90 | 60–70 | 12.7 | 79.3 | 13.2 | | | 0.9 | 95.5 | 68.2 |
| 6 | SbF₃/C* | 0.96 | 2.39 | 100 | 13.2 | 12.0 | 31.4 | 29.0 | 2.9 | 5.0 | 87.5 | 35.7 |
| 7 | TiF₄/C* | 1.01 | 2.35 | 100 | 13.0 | 88.5 | 1.3 | 0 | | 0.6 | 72 | 11.3 |
| 8 | SbF₃/C* | 0.95 | 2.14 | 100 | 14.2 | 83.8 | 2.2 | 0 | | 1.5 | 64.5 | 13.6 |
| 9 | SbF₃/C* | 0.98 | 2.00 | 120 | 14.0 | 11.9 | 28.3 | 1.0 | | 51.3 | 40.0 | 32.1 |

*The carbon is activated carbon.
(a) For determining the conversion to the various products reported in the table above, the products were separated by fractional distillation, except for the dichlorofluoroethane-vinylidene chloride mixtures, in which the percentages of the two components were determined by calculations from the refractive indices.
(b) Calculated from the refractive index of the main dichlorofluoroethane fraction.

The contact time recorded in the table was calculated from the formula:

$$\text{Contact time} = \frac{3600 \times 273 \times V}{22{,}400 \times N \times T}$$

in which V is the volume of the reactor in milliliters, N is the gram-moles per hour feed of the reactants $$(HF + CH_3CCl_3)$$

and T is the absolute temperature in the reactor tube.

It can readily be seen from the table that the use of the catalysts of the present invention, as in Runs 1 to 5, inclusive, results in much higher yields of the dichlorofluoroethane. It is also apparent that the purity of the product is generally much better with the catalysts of the present invention, ranging up to 96.5%.

A commercially feasible process for the vapor phase fluorination of methyl chloroform to 1,1-dichloro-1-fluoroethane has been described. The process involves fluorination by the use of hydrogen fluoride over stannic fluoride on activated carbon, or over aluminum fluoride as a catalyst, and suitable conditions for the fluorination have been described. The described vapor phase fluorination of methyl chloroform to 1,1-dichloro-1-fluoroethane can be adapted to a continuous process for preparing vinylidene chlorofluoride in which the intermediate 1,1-dichloro-1-fluoroethane is immediately pyrolyzed to vinylidene chlorofluoride.

I claim:

1. A process for the preparation of 1,1-dichloro-1-fluoroethane in which anhydrous hydrogen fluoride and methyl chloroform are passed over a catalytic material heated to a temperature of 60 to 125° C., the said catalytic material comprising a catalyst selected from the group consisting of stannic fluoride on activated carbon, and aluminum fluoride.

2. The method of claim 1 in which the catalyst is aluminum fluoride.

3. The method of claim 1 in which the catalyst is stannic fluoride on activated carbon.

4. The method of claim 1 in which the hydrogen fluoride is charged at a rate of 1 to 2 moles per mole of methyl chloroform charged.

5. The method of claim 1 in which the process is continuous and the 1,1-dichloro-1-fluoroethane product is separated, and the methyl chloroform and hydrogen fluoride are recycled over the heated catalyst.

6. The vapor phase fluorination of methyl chloroform to 1,1-dichloro-1-fluoroethane by passing methyl chloroform and anhydrous hydrogen fluoride over a heated catalyst material at a temperature of 60 to 125° C. for 5 to 20 seconds, the said catalyst material comprising a catalyst selected from the group consisting of stannic fluoride on activated carbon, and aluminum fluoride.

7. The method of fluorinating methyl chloroform to 1,1 - dichloro - 1 - fluoroethane which comprises passing methyl chloroform and anhydrous hydrogen fluoride over an anhydrous aluminum fluoride catalyst heated to a temperature of 90 to 125° C., until a substantial amount of 1,1-dichloro-1-fluoroethane is produced.

8. The method of claim 7 in which the contact time is 5 to 20 seconds.

References Cited in the file of this patent

UNITED STATES PATENTS

| 2,673,139 | Woolf et al. | Mar. 23, 1954 |
| 2,709,688 | Bandes et al. | May 31, 1955 |

FOREIGN PATENTS

| 670,130 | Germany | Jan. 12, 1939 |

OTHER REFERENCES

Torkington et al.: "Trans-Faraday Soc.," vol. 41 (1945), page 237.